United States Patent
Wu et al.

(10) Patent No.: US 10,611,100 B2
(45) Date of Patent: Apr. 7, 2020

(54) BUOYANCY MODULE

(71) Applicant: 3M INNOVATIVE PROPERTIES COMPANY, St. Paul, MN (US)

(72) Inventors: Yong K. Wu, Woodbury, MN (US); Siegmund Papp, Woodbury, MN (US); Andrew J. Peterson, White Bear Lake, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/735,762

(22) PCT Filed: Jun. 10, 2016

(86) PCT No.: PCT/US2016/036969
§ 371 (c)(1),
(2) Date: Dec. 12, 2017

(87) PCT Pub. No.: WO2016/201285
PCT Pub. Date: Dec. 15, 2016

(65) Prior Publication Data
US 2018/0169977 A1    Jun. 21, 2018

Related U.S. Application Data

(60) Provisional application No. 62/174,568, filed on Jun. 12, 2015.

(51) Int. Cl.
*B29C 70/66* (2006.01)
*E21B 17/01* (2006.01)
(Continued)

(52) U.S. Cl.
CPC .............. *B29C 70/66* (2013.01); *B29C 70/44* (2013.01); *E21B 17/012* (2013.01);
(Continued)

(58) Field of Classification Search
CPC ....... B29C 70/66; B29C 70/44; E21B 17/012; B29K 2509/08; B29K 2063/00; B29K 2105/04; B29K 2105/251; B29L 2031/706
See application file for complete search history.

(56) References Cited

U.S. PATENT DOCUMENTS 3,864,426 A    2/1975  Salensky
4,293,519 A   10/1981  Knappenberger
(Continued)

FOREIGN PATENT DOCUMENTS

CN    1261479    1/2005
CN    100378166  4/2008
(Continued)

OTHER PUBLICATIONS

6—Hollow Glass Microspheres in Thermosets—Epoxy Syntactic Foams, Plastics Design Library 2015, pp. 147-174 Dinesh Pinisetty, Vasanth C.Shunmugasamy, Nikhil Gupta https://www.sciencedirect.com/science/article/pii/B9781455774432000062 (Year: 2015).*

(Continued)

*Primary Examiner* — Anthony D Wiest
(74) *Attorney, Agent, or Firm* — Thomas M. Spielbauer

(57) ABSTRACT

Buoyancy modules (200) are made from a foam composition that includes a combination of a thermally fusable powder and glass microspheres heated in a manner that provides a hardened syntactic foam having both low density and a high degree of compressive strength. An outer barrier (220) may enclose the buoyancy module.

12 Claims, 2 Drawing Sheets

(51) Int. Cl.
*B29C 70/44* (2006.01)
*B29L 31/00* (2006.01)
*B29K 63/00* (2006.01)
*B29K 105/04* (2006.01)
*B29K 105/00* (2006.01)
*B29K 509/08* (2006.01)

(52) U.S. Cl.
CPC ...... *B29K 2063/00* (2013.01); *B29K 2105/04* (2013.01); *B29K 2105/251* (2013.01); *B29K 2509/08* (2013.01); *B29L 2031/706* (2013.01)

(56) References Cited

U.S. PATENT DOCUMENTS

| | | | |
|---|---|---|---|
| 4,842,562 A | | 6/1989 | Supal |
| 5,587,231 A | * | 12/1996 | Mereer ............... B29C 70/086 |
| | | | 442/375 |
| 5,888,642 A | * | 3/1999 | Meteer ............... B29C 70/086 |
| | | | 156/77 |
| 6,949,282 B2 | * | 9/2005 | Obeshaw ............... B21C 37/15 |
| | | | 138/119 |
| 7,037,865 B1 | | 5/2006 | Kimberly |
| 7,101,607 B2 | * | 9/2006 | Mollendorf ............ B32B 5/18 |
| | | | 428/158 |
| 7,121,767 B1 | | 10/2006 | Watkins |
| 7,662,468 B2 | * | 2/2010 | Bainbridge ....... A41D 31/0044 |
| | | | 2/455 |
| 2006/0062638 A1 | | 3/2006 | Bergeron |
| 2010/0009159 A1 | | 1/2010 | Kimberly |
| 2010/0279100 A1 | | 11/2010 | Heikkila |
| 2011/0017516 A1 | | 1/2011 | Gollmyer |

FOREIGN PATENT DOCUMENTS

| | | |
|---|---|---|
| CN | 101403668 | 4/2009 |
| CN | 102030887 | 4/2011 |
| CN | 102320743 | 1/2012 |
| CN | 102702679 | 10/2012 |
| CN | 102775727 | 11/2012 |
| CN | 102936395 | 2/2013 |
| CN | 103013050 | 4/2013 |
| CN | 103172975 | 6/2013 |
| CN | 202965316 U | 6/2013 |
| CN | 103266398 A | 8/2013 |
| CN | 103395485 | 11/2013 |
| CN | 103421278 | 12/2013 |
| CN | 103482035 | 1/2014 |
| CN | 103483773 | 1/2014 |
| CN | 103483774 | 1/2014 |
| CN | 203403835 | 1/2014 |
| CN | 103665615 | 3/2014 |
| CN | 103665768 | 3/2014 |
| CN | 103707590 | 4/2014 |
| CN | 103709606 | 4/2014 |
| CN | 103709607 | 4/2014 |
| CN | 103754340 | 4/2014 |
| CN | 103773301 | 5/2014 |
| CN | 103788396 | 5/2014 |
| CN | 103819871 | 5/2014 |
| CN | 103819872 | 5/2014 |
| CN | 103819873 | 5/2014 |
| CN | 103865235 | 6/2014 |
| CN | 103865236 | 6/2014 |
| CN | 103865237 | 6/2014 |
| CN | 103865238 | 6/2014 |
| CN | 103937154 | 7/2014 |
| CN | 103937155 | 7/2014 |
| CN | 103937165 | 7/2014 |
| CN | 103937166 | 7/2014 |
| CN | 103937167 | 7/2014 |
| CN | 103979796 | 8/2014 |
| CN | 104059334 | 9/2014 |
| CN | 104072950 | 10/2014 |
| DE | 19819929 | 11/1999 |
| RU | 2213075 C2 | 9/2003 |
| WO | WO 1997-29900 | 8/1997 |
| WO | WO 2004-090348 | 10/2004 |

OTHER PUBLICATIONS

"A new Syntactic Foam Manufacturing Method and Study of Its Properties" 20th International Conference on Composi te Materials Copenhagen, Jul. 19-24, 2015; Qiyong Yu1, Yan Zhao1, Zhian Mi2 Yuan Chen3 1 School of Materials Science and Engineering, Beihang University, Beijing 100191 (Year: 2015).*

Engineered Syntactic Systems, "What is Syntactic Foam" https://esyntactic.com/products-solutions/what-is-syntactic-foam/ (Retrieved from the internet on Sep. 9, 2019, archived as noted in the Internet Wayback Machine Mar. 22, 2016) (Year: 2016).*

Puterman, "Syntactic Foams I. Preparation, Structure and Properties", Journal of Cellular Plastics, Jul./Aug. 1980, pp. 223-229.

International Search Report for PCT International Application No. PCT/US2016/036969, dated Sep. 1, 2016, 6 pages.

* cited by examiner

BUOYANCY MODULE

CROSS REFERENCE TO RELATED APPLICATIONS

This application is a national stage filing under 35 U.S.C. 371 of PCT/US2016/036969, filed Jun. 10, 2016, which claims the benefit of Provisional Application No. 62/174,568, filed Jun. 12, 2015, the disclosure of which is incorporated by reference in their entirety herein.

FIELD OF THE INVENTION

Provided are buoyancy modules and methods for making the same. More particularly, the provided buoyancy modules include subsea buoyancy modules containing syntactic foam materials.

BACKGROUND

Various subsea applications require use of flexible conduits, such as risers, umbilicals, and cables. In many cases, these conduits run between a subsea structure and a surface vessel or platform and enable communication between these bodies. To preserve the integrity of the conduit and its associated structures, the conduit generally needs to be maintained in a relaxed and gently bent configuration. This enables a reasonable range of movement without putting the conduit under significant tension.

Distributed buoyancy modules provide a way to induce these subsea "wave" configurations by imparting uplift to selected portions of the conduit. These modules typically have two main components: a flotation unit and a fastening mechanism for coupling the flotation unit to the conduit. Buoyancy modules are widely used in offshore oil and gas explorations and subsea remotely operated vehicles. When used with subsea drilling risers, these buoyancy modules can reduce the top tension of the drilling rigs.

As modern offshore oil and gas rigs move to progressively deeper waters, the technical requirements for buoyancy modules become more stringent. It is desirable to provide a high degree of hydrostatic pressure resistance for deeper water applications along with a low density to enable a consistent physical dimensions of the modules. Since these properties are often inversely related, achieving both simultaneously can be a significant engineering challenge.

SUMMARY

In existing buoyancy modules, the flotation unit has been made from an epoxy syntactic foam containing hollow fillers. Some manufacturers have explored buoyancy modules using foams made from composite macrospheres having a diameters ranging from 10-100 millimeters. While such foams are capable of providing low density, they tend to have poor hydrostatic pressure resistance because the macrospheres have relatively poor crush strength.

Others have used hollow glass microspheres as light fillers mixed in with liquid epoxy resins to fabricate buoyancy modules. These smaller sized fillers have a higher crush strength compared with the macrospheres, but their use can lead to a manufacturing issue. Mixing in these glass bubbles increases the viscosity of the liquid resin mixture, which can limit the amount of filler that can be added while maintaining a low enough viscosity for easy processing. This problem can be mitigated by blending in reactive diluents, but these diluents were observed to yield brittleness and generally inferior mechanical properties in the cured epoxy. A further drawback of liquid epoxy resins is the limited work life of these materials once mixed with a curing agent.

The provided buoyancy modules are made using a combination of a thermally fusable powder and glass microspheres heated in a manner that provides a hardened syntactic foam having both low density and a high degree of compressive strength.

In a first aspect, a method of making a buoyancy module is provided. The method comprises: obtaining a mixture by blending the following components: 35 to 60 volume percent thermally fusable powder; and 40 to 65 volume percent glass microspheres, each amount based on the overall volume of the mixture; shaping the mixture; and heating the thermally fusable powder under a vacuum to provide a hardened syntactic foam, the vacuum being sufficient to remove substantially all embedded voids in the hardened syntactic foam excluding voids associated with the glass microspheres.

In a second aspect, a method of making a buoyancy module is provided, comprising: obtaining a mixture by blending the following components: 15 to 60 volume percent thermally fusable powder; and 40 to 95 volume percent glass microspheres, each amount based on the overall volume of the mixture; shaping the mixture; heating the thermally fusable powder under a vacuum to provide a hardened syntactic foam; and applying a barrier layer over at least a portion of the hardened syntactic foam.

In a third aspect, a buoyancy module is provided, comprising: a hardened syntactic foam comprising: 35 to 60 volume percent thermally fusable powder; and 40 to 65 volume percent glass microspheres, each amount based on the overall volume of the hardened syntactic foam, wherein the hardened syntactic foam is substantially free of embedded voids excluding voids associated with the glass microspheres.

In a fourth aspect, a buoyancy module is provided comprising: a hardened syntactic foam comprising: 15 to 60 volume percent thermally fusable powder; and 40 to 85 volume percent glass microspheres, each amount based on the overall volume of the hardened syntactic foam; and a barrier layer disposed on at least a portion of the hardened syntactic foam.

Figure 1:
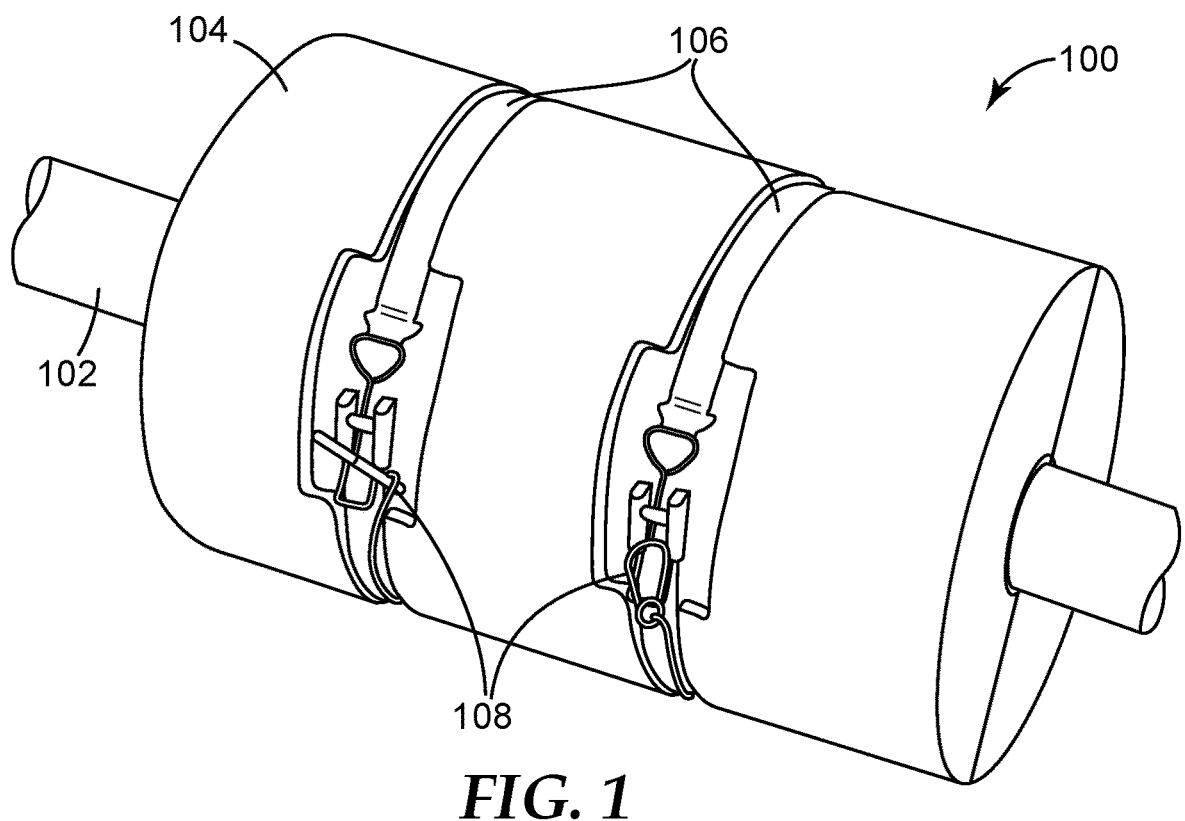
FIG. 1 is a perspective view of a buoyancy module coupled to a flexible conduit according to one exemplary embodiment.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"Particle diameter" means the longest dimension of a given particle.

"Substantially free" means having less than 2 percent by volume relative to the overall weight of a given composition.

DETAILED DESCRIPTION

Described herein are structural and compositional aspects of buoyancy modules capable of being used in deep sea applications. This description shall address assorted buoyancy module configurations, foam compositions, barrier layer compositions, and methods of making and assembling the same.

Buoyancy Module Configurations

A buoyancy module according to one exemplary embodiment is shown in FIG. 1 and herein designated by the numeral 100. In this view, the buoyancy module 100 has a generally cylindrical shape when fully assembled and is releasably coupled to a conduit 102. The conduit 102 is generally flexible and can connect on one end to a platform or other structure on the surface of the water and connect on its opposite end to a subsea device, although such connections are not illustrated here.

The buoyancy module 100 includes a body 104 that engages the conduit 102 in encircling relation and a pair of belts 106 that circumscribe the body 104 and assist in securing the body 104 to the conduit 102. The belts 106 can be secured and released using respective latches 108 that mutually couple the ends of the belts 106 to each other, a purpose akin to that of a belt buckle used in clothing.

Figure 2:
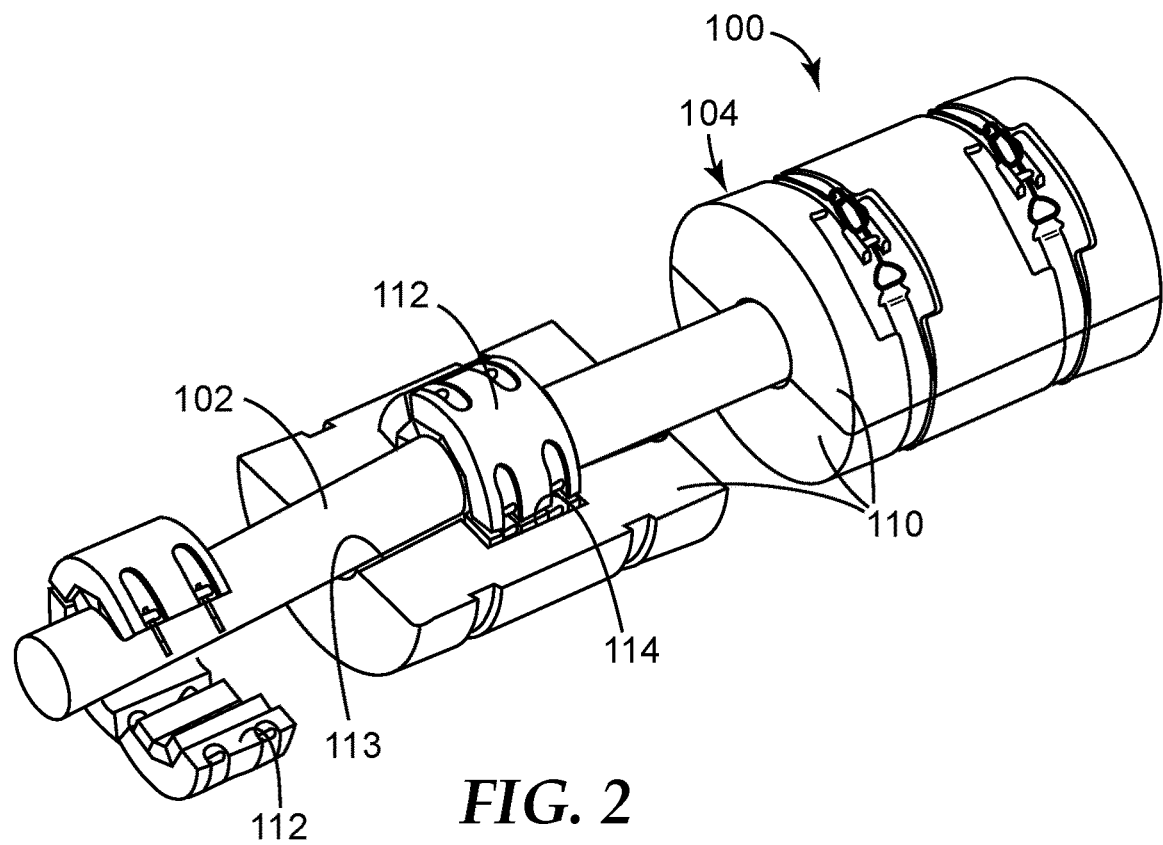
FIG. 2 is a perspective view showing the buoyancy module of FIG. 1 in three different stages of assembly.

FIG. 2 illustrates internal elements of the buoyancy module 100 as they would appear when the buoyancy module 100 is being coupled to the conduit 102.

As shown on the right hand side of FIG. 2, the buoyancy module 100 is shown fully assembled. The body 104, as shown, is comprised of two symmetric portions 110 (in this case, halves) that come together in a mating, clam shell configuration around the conduit 102 in encircling relation. The portions 110 come apart easily to allow removal of the buoyancy module 100 or longitudinal adjustment of its position along the conduit 102. Alternatively, the body 104 could be divided into three or more sections.

To attach the buoyancy module 100 to a length of conduit 102, an operator can use a jointed crimping mechanism 112 (also shown in FIG. 2) that can securely clamp to the conduit 102 to restrict longitudinal sliding along conduit 102. As further shown in the figure, each portion 110 of the body 104 has a channel 113 with a complemental recess 114 where the crimping mechanism 112 resides when the buoyancy module 100 is assembled. The crimping mechanism 112 thus provides an interference fit within the body 104 that allows the module 100 to be both securely held in place while also easily removed or adjusted by an operator, as the need arises.

Figure 3:
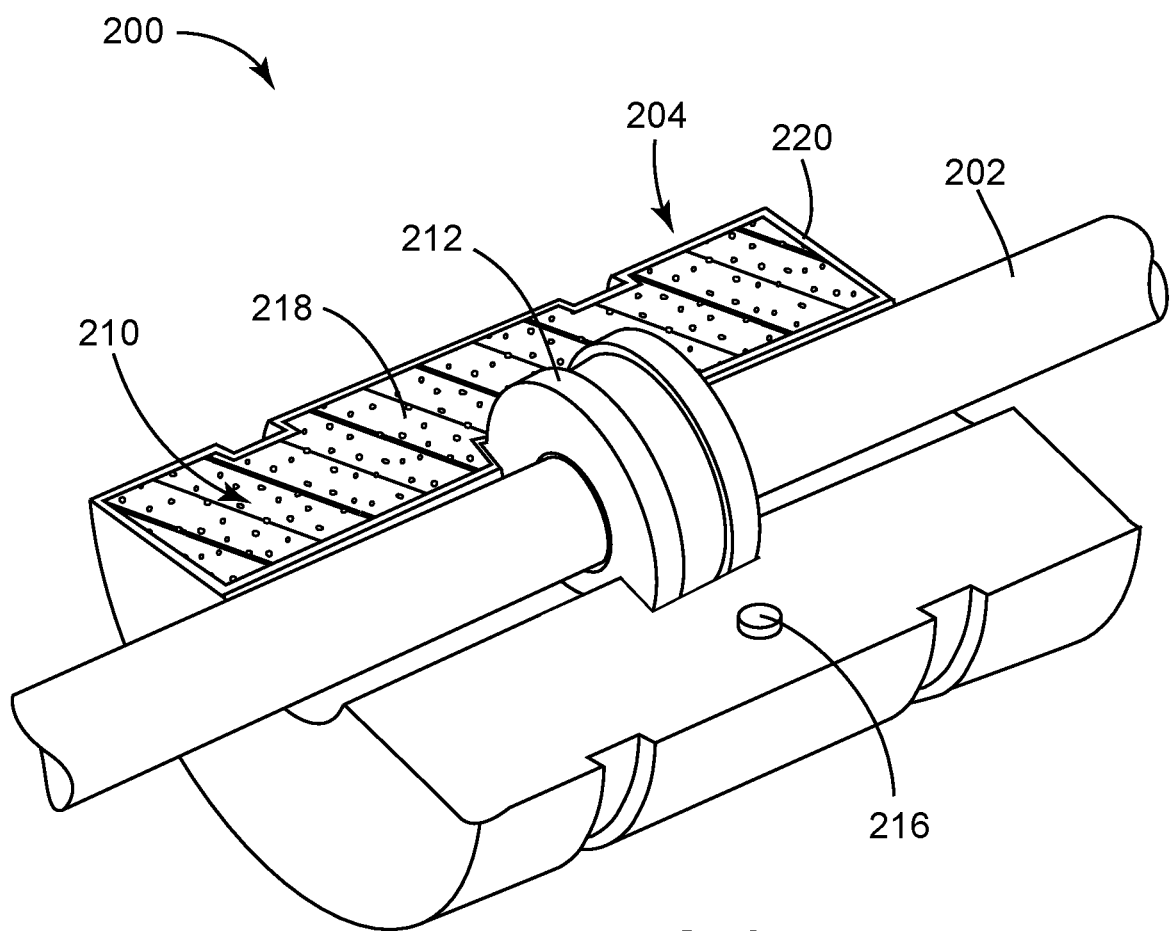
FIG. 3 is a perspective view of a partially disassembled buoyancy module according to another exemplary embodiment.

FIG. 3 shows an alternative buoyancy module 200 on an exemplary conduit 202. This embodiment shares features of the aforementioned buoyancy module 100, such as a crimping mechanism 212 that directly couples to the conduit 202 and a body 204 split into complemental portions 210.

Certain differences are also manifest. For example, each portion 210 of the body 204 has one or more registration features 216 shaped to mate with complemental features on the opposing portion 210 (not shown in FIG. 3) to prevent relative sliding between adjoining portions 210 when they are fastened to each other.

As further illustrated in FIG. 3, each portion 210 of the body 204 includes an inner core member 218 and an outer barrier layer 220. In a preferred embodiment, the inner core member 218 is made from a foam composition disclosed herein. The foam composition is primarily responsible for the buoyancy of the module 200. The outer barrier layer 220, while not particularly restricted, can be advantageously made from a material that is more tough, durable and/or water resistant than the core member 218.

Foam Compositions

Provided foam compositions include syntactic foam compositions made from hollow glass microspheres (also sometimes referred to as glass bubbles or microballoons) encapsulated in a polymeric matrix material. The polymeric matrix material derives from a thermally fusable powder. Preferred embodiments of the foam composition do not contain any reactive diluents, which tend to degrade the physical properties of the foam.

In preferred compositions, the glass microspheres have a combination of low density and high strength—that is, these microspheres should provide a high degree of buoyancy while simultaneously resist cracking when flexed or compressed. Particularly suitable glass microspheres have been found to have a median diameter of at least 10 micrometers, at least 12 micrometers, or at least 15 micrometers. On the upper end, suitable glass microspheres can have a median diameter of at most 70 micrometers, at most 45 micrometers, or at most 35 micrometers.

The glass microspheres can also have various particle diameter distributions, which affect their packing density within the continuous matrix material. While the size distribution need not be particularly restricted, good packing of the glass microspheres can be achieved using a $D_{80}$-$D_{20}$ diameter ratio (the quotient between $80^{th}$ and $20^{th}$ percentile particle diameters) of at least 5, at least 7, or at least 10. In the same or alternative embodiments, the $D_{80}$-$D_{20}$ diameter ratio could be at most 20, at most 30, or at most 50.

The glass microsphere component may be present in an amount of at least 40 percent, at least 45 percent, at least 50 percent, at least 55 percent, or at least 60 percent by volume, based on the overall volume of the foam composition. In useful embodiments, the glass microspheres may be present in an amount of at most 85 percent, at most 80 percent, at most 75 percent, at most 70 percent, or at most 65 percent by volume based on the overall volume of the foam composition.

Thermally fusable powders can include one or more thermoplastic materials. Suitable thermoplastic materials can include, for example, ultra-high molecular weight polyethylene, polyamide, polyphenylene sulfide, polyimide, poly ether ether ketone, polycarbonate, polyamideimide, polyetherimide, and polyetherketoneketone, along with copolymers and mixtures thereof.

Alternatively or in combination, the thermally fusable powder may also include a thermoset material, or crosslinkable material. Particularly useful thermoset materials include one-part crosslinkable epoxy resins, phenolic resins, epoxy resins, modified polyesters, urethane acrylics, urethane polyesters, epoxy functionalized acrylics, glycidyl methacrylate acrylics, polyester triglycidyl isocyanurates, and copolymers and mixtures thereof.

The thermally fusable powder should be present in an amount that provides sufficient continuity to allow the hardened foam composition to bind together cohesively under normal installation and operating conditions. Exemplary embodiments have at least 15 percent, at least 20 percent, at least 25 percent, at least 30 percent, or at least 35 percent by volume, based on the overall volume of the mixture. Such embodiments could have at most 60 percent, at most 55 percent, at most 50 percent, at most 45 percent, or at most 40 percent by volume, based on the overall volume of the mixture.

It is preferable for the thermally fusable powder to have a particle diameter that is sufficiently large to allow for efficient mixing with the glass microspheres, yet small enough that the resin component can easily disperse and fill the interstitial spaces around the glass microspheres when the mixture is heated and/or cured. Optionally, the thermally fusable powder has a median particle diameter of at least 1 micrometer, at least 5 micrometers, or at least 10 micrometers. Optionally, the thermally fusable powder has a median particle diameter of at most 200 micrometers, at most 100 micrometers, or at most 40 micrometers.

Desirable ranges of particle diameter for the thermally fusable powder are dependent, in part, on the coarseness of the glass microspheres. Significant disparity between the two particulate components can significantly complicate or impair mixing efficiency. In preferred embodiments, the thermally fusable powder and glass microspheres have a median particle diameter ratio of at least 0.5:1, at least 0.75:1 or at least 0.85:1. In preferred embodiments, the thermally fusable powder and glass microspheres have a median particle diameter ratio of at most 1.25:1, at most 1.15:1 or at most 1.05:1.

Barrier Layer Compositions

The barrier layer serves the purpose of protecting the foam composition from damage that is due to abrasion and impact with subsea objects or the conduit itself. The barrier layer can also provide a barrier to damage from light rays, such as ultraviolet light, which can degrade and render brittle certain polymers over time. Finally, it would be beneficial for the barrier layer to prevent infiltration of liquids, such as water, oil, or even solvents, into the foam.

Preferably, the barrier layer is made from a tough, hard material. In some embodiments, the barrier layer is comprised of a polymer. Suitable polymers include silicones, polyurethanes, epoxies, polypropylene, polyethylene, polycarbonate, polyacrylates, polyesters, fluoropolymers, polyvinyl chloride, acrylonitrile butadiene styrene.

Barrier materials can also include metallic materials, such as aluminum, steel, and alloys thereof.

To further provide enhanced strength, the barrier layer may further include one or more reinforcing additives, such as a fiber additive. Discrete fiber additives may be compounded into the polymer or formed as a discrete layer or layers within the polymer. Fiber materials useful for this purpose include, for example, glass, carbon, polymers, ceramics, minerals, and metals.

The overall strength of the hardened syntactic foam should be sufficiently high to resist crushing at high hydrostatic pressures and denting as a result of minor collisions between the buoyancy module and other objects at sea. In a preferred embodiment, the hardened syntactic foam displays a hydrostatic strength of at least 30 MPa, at least 50 MPa, or at least 60 MPa. In preferred embodiments, the hardened syntactic foam displays a hydrostatic strength of up to 170 MPa, up to 140 MPa, or up to 100 MPa.

The buoyancy of the hardened syntactic foam is reflected by its density. Lower densities provide greater buoyancy and can be achieved, for example, by increasing the loading of the glass microspheres. This density can be at least 0.45 g/cm$^3$, at least 0.50 g/cm$^3$, or at least 0.55 g/cm$^3$. The density of the hardened syntactic foam can be at most 0.80 g/cm$^3$, at most 0.70 g/cm$^3$, or at most 0.66 g/cm$^3$.

Methods of Making

The provided buoyancy modules can be made by mixing the fusable resin powder, glass microspheres, along with any other optional additives, molding the mixed composite material into a desired shape, and then applying heat to form the molded syntactic foam material. If present, an outer barrier layer can then be disposed onto the foam. In the case of polymeric barrier layers, this can be accomplished by laminating, dipping or coating from a polymer solution, thermoforming, or any other known method. Where the barrier layer is made from a metal, it can be pre-formed into a sealable enclosure, the foam received in the enclosure, and the enclosure subsequently sealed.

Advantageously, using this method, the quantity of hollow microspheres mixed with the matrix material can vary over a very wide range while remaining well mixed. This enables the manufacture of syntactic foams that display both high strength and low densities.

Liquid epoxy-based systems, by contrast, are often difficult to make at higher microsphere loadings because of the increasing viscosity of the composite mixture and imperfect capabilities for compounding such a mixture. Even where such compounding is possible, high viscosities can hinder dispersive mixing of the microspheres and impede the deaeration process, which can result in voids in the final foam material. While a small degree of voids may be tolerated, voids are generally undesirable because they tend to adversely affect foam strength and allow water to permeate into the foam, reducing buoyancy.

The uncured composite powder mixture is then molded or otherwise formed into a desired shape. Heat is applied during the molding process, causing the thermally fusable powder to flow around the glass microspheres, thereby producing the syntactic foam. Provided that the powder mixture is well dispersed and distributed, voids located in the interstices of the mixture can substantially disappear as they become filled with the now-flowable resin.

In a preferred embodiment, the heating of the powder mixture takes place under a reduced pressure, or vacuum. Advantageously, heating and molding the powder mixture under a vacuum can further assist in removing entrained voids from the foam as it hardens or cures. The hardened syntactic foam derived therefrom can be made substantially free of any embedded voids (excluding those associated with the glass microspheres). Optionally, the hardened foam has at most 1.5 percent, 1 percent, or 0.5 percent by volume of such embedded voids.

Optionally, multiple stages of heating at various temperatures and various time periods can also be used to facilitate uniform curing of the foam based on the resin manufacturer's recommended curing schedules. These can be further adapted to achieve the desired properties of the syntactic foam. In preferred embodiments, recommended temperatures for curing epoxy powders range from 100° C. to 170° C.

The provided buoyancy modules and methods of making can be further exemplified by the following non-exhaustive embodiments:

1. A method of making a buoyancy module comprising: obtaining a mixture by blending the following components: 35 to 60 volume percent thermally fusable powder; and 40 to 65 volume percent glass microspheres, each amount based on the overall volume of the mixture; shaping the mixture; and heating the thermally fusable powder under a vacuum to provide a hardened syntactic foam, the vacuum being sufficient to remove essentially all embedded voids in the hardened syntactic foam excluding voids associated with the glass microspheres.

2. The method of embodiment 1, further comprising disposing a barrier layer over at least a portion of the hardened syntactic foam.

3. A method of making a buoyancy module comprising: obtaining a mixture by blending the following components: 15 to 60 volume percent thermally fusable powder; and 40 to 95 volume percent glass microspheres, each amount based on the overall volume of the mixture; shaping the mixture; heating the thermally fusable powder under a vacuum to provide a hardened syntactic foam; and applying a barrier layer over at least a portion of the hardened syntactic foam.

4. The method of any one of embodiments 1-3, wherein the hardened syntactic foam is substantially free of embedded voids excluding voids associated with the glass microspheres.

5. The method of any one of embodiments 2-4, wherein the barrier layer comprises a polymer selected from silicones, polyurethanes, polyamide, epoxies, phenolics, polypropylene, polyethylene, polycarbonate, polyacrylates, polyesters, fluoropolymers, polyvinyl chloride, acrylonitrile butadiene styrene.

6. The method of embodiment 5, wherein the barrier layer further comprises a fiber additive.

7. The method of embodiment 6, wherein the fiber additive comprises one or more of glass, carbon, polymeric, ceramic, mineral, and metallic fibers.

8. The method of any one of embodiments 2-4, wherein the barrier layer comprises a metallic material comprising aluminum, steel, or alloys thereof.

9. The method of any one of embodiments 1-8, wherein the thermally fusable powder comprises a thermoplastic selected from ultra high molecular weight polyethylene, polyamide, polyphenylene sulfide, polyimide, poly ether ether ketone, polycarbonate, polyamideimide, polyetherimide, polyetherketoneketone, and copolymers and mixtures thereof.

10. The method of any one of embodiments 1-8, wherein the thermally fusable powder comprises a thermoset selected from: one-part crosslinkable epoxy resins, phenolic resins, epoxy modified polyesters, urethane acrylics, urethane polyesters, epoxy functionalized acrylics, glycidyl methacrylate acrylics, polyester triglycidyl isocyanurates, and copolymers and mixtures thereof.

11. The method of any one of embodiments 1-10, wherein the glass microspheres are present in an amount ranging from 50 to 65 volume percent, based on the overall volume of the mixture.

12. The method of embodiment 11, wherein the glass microspheres are present in an amount ranging from 55 to 65 volume percent, based on the overall volume of the mixture.

13. The method of any one of embodiments 1-12, wherein the glass microspheres have a median diameter $D_{50}$ ranging from 10 micrometers to 70 micrometers.

14. The method of embodiment 13, wherein the glass microspheres have a median diameter $D_{50}$ ranging from 15 micrometers to 45 micrometers.

15. The method of embodiment 14, wherein the glass microspheres have a median diameter $D_{50}$ ranging from 15 micrometers to 35 micrometers.

16. The method of any one of embodiments 1-15, wherein the glass microspheres have a $D_{50}$-$D_{20}$ diameter ratio ranging from 5 micrometers to 50 micrometers.

17. The method of embodiment 16, wherein the glass microspheres have a $D_{80}$-$D_{20}$ diameter ratio ranging from 10 to 30.

18. The method of embodiment 17, wherein the glass microspheres have a $D_{80}$-$D_{20}$ diameter ratio ranging from 10 to 20.

19. The method of any one of embodiments 1-18, wherein the thermally fusable powder has a median particle diameter ranging from 1 micrometer to 200 micrometers.

20. The method of embodiment 19, wherein the thermally fusable powder has a median particle diameter ranging from 5 micrometer to 100 micrometers.

21. The method of embodiment 20, wherein the thermally fusable powder has a median particle diameter ranging from 10 micrometer to 40 micrometers.

22. The method of any one of embodiments 1-21, wherein the thermally fusable powder and glass microspheres have a median particle diameter ratio ranging from 0.5:1 to 1.25:1.

23. The method of embodiment 22, wherein the thermally fusable powder and glass microspheres have a median particle diameter ratio ranging from 0.75:1 to 1.15:1.

24. The method of embodiment 22, wherein the thermally fusable powder and glass microspheres have a median particle diameter ratio ranging from 0.85:1 to 1.05:1.

25. The method of any one of embodiments 1-24, wherein the mixture is essentially free of any reactive diluents.

26. The method of any one of embodiments 1-25, wherein shaping the mixture comprises injecting the mixture into a mold.

27. The method of any one of embodiments 1-26, wherein the shaped mixture defines a recess or aperture for accommodating at least a portion of a subsea conduit.

28. The method of any one of embodiments 1-27, wherein the shaped mixture comprises two or more discrete parts having configurations adapted for releasable coupling to each other in encircling relation with the subsea conduit.

29. The buoyancy module made using the method of any one of embodiments 1-28.

30. The buoyancy module of embodiment 29, wherein the hardened syntactic foam displays a hydrostatic strength ranging from 30 MPa to 170 MPa.

31. The buoyancy module of embodiment 30, wherein the hardened syntactic foam displays a hydrostatic strength ranging from 50 MPa to 140 MPa.

32. The buoyancy module of embodiment 31, wherein the hardened syntactic foam displays a hydrostatic strength ranging from 60 MPa to 100 MPa.

33. The buoyancy module of any one of embodiments 29-32, wherein the hardened syntactic foam has a density ranging from 0.45 g/cm3 to 0.80 g/cm3.

34. The buoyancy module of embodiment 33, wherein the hardened syntactic foam has a density ranging from 0.50 g/cm3 to 0.70 g/cm3.

35. The buoyancy module of embodiment 34, wherein the hardened syntactic foam has a density ranging from 0.55 g/cm3 to 0.66 g/cm3.

36. A buoyancy module comprising: a hardened syntactic foam comprising: 35 to 60 volume percent thermally fusable powder; and 40 to 65 volume percent glass microspheres, each amount based on the overall volume of the hardened syntactic foam, wherein the hardened syntactic foam is substantially free of embedded voids excluding voids associated with the glass microspheres.

37. The buoyancy module of embodiment 36, further comprising a barrier layer disposed on at least a portion of the hardened syntactic foam.

38. A buoyancy module comprising: a hardened syntactic foam comprising: 15 to 60 volume percent thermally fusable powder; and 40 to 85 volume percent glass microspheres, each amount based on the overall volume of the hardened syntactic foam; and a barrier layer disposed on at least a portion of the hardened syntactic foam.

39. The buoyancy module of embodiment 38, wherein the hardened syntactic foam is substantially free of embedded voids excluding voids associated with the glass microspheres.
40. The buoyancy module of any one of embodiments 36-39, wherein the thermally fusable powder comprises a thermoplastic selected from: ultra high molecular weight polyethylene, polyamide, polyphenylene sulfide, polyimide, poly ether ether ketone, polycarbonate, polyamideimide, polyetherimide, polyetherketoneketone, and copolymers and mixtures thereof.
41. The buoyancy module of any one of embodiments 36-39, wherein the thermally fusable powder comprises a one-part crosslinkable epoxy resin.
42. The buoyancy module of any one of embodiments 37-41, wherein the barrier layer comprises a polymer selected from: silicones, polyurethanes, epoxies, polypropylene, polyethylene, polycarbonate, polyacrylates, polyesters, fluoropolymers, polyvinyl chloride, acrylonitrile butadiene styrene, and copolymer and mixtures thereof.
43. The buoyancy module of any one of embodiments 37-41, wherein the barrier layer comprises a metallic material comprising aluminum, steel, or alloys thereof.
44. The buoyancy module of any one of embodiments 36-43, wherein the hardened syntactic foam has a recess or aperture adapted to accommodate at least a portion of a subsea conduit.
45. The buoyancy module of any one of embodiments 29-44, further comprising a latch for releasably coupling the hardened syntactic foam to a subsea conduit.

Objects and advantages of this disclosure are further illustrated by the following non-limiting examples, but the particular materials and amounts thereof recited in the Examples below, as well as other conditions and details, should not be construed to unduly limit this disclosure.

EXAMPLES

In these examples, amounts may be expressed in parts by weight or parts by volume, as noted. Abbreviations include: HGM=hollow glass microspheres, eq=equivalents, g=grams, hrs=hours, rpm=revolutions per minute, wt=weight, P=poise, and psi=pounds per square inch.

List of Materials

| Reference | Description |
| --- | --- |
| Powdered Epoxy | A one-part 100% solids epoxy powder sold under the tradename "Scotchcast ™ Electrical Resin 265" and commercially available from 3M Company, Maplewood, MN. |
| Liquid Epoxy | A liquid (viscosity 50-65 P @ 25° C.) bisphenol A epichlorhydrin epoxy resin with epoxide equivalent weight of 177 g/eq sold under the tradename "EPON ™ Resin 825" and commercially available from Momentive Performance Materials, Inc., Waterford, NY. |
| HGM 1 | Hollow glass microspheres with a density of 0.125 g/cc and an isostatic crush strength of 250 psi commercially available from 3M Company, Maplewood, MN under the trade designation "3M ™ Glass Bubbles K1." |
| HGM 2 | Hollow glass microspheres with a density of 0.23 g/cc and an isostatic crush strength of 3000 psi commercially available from 3M Company, Maplewood, MN under the trade designation "3M ™ Glass Bubbles XLD3000." |
| HGM 3 | Hollow glass microspheres with a density of 0.25 g/cc and an isostatic crush strength of 750 psi commercially available from 3M Company, Maplewood, MN under the trade designation "3M ™ Glass Bubbles K25." |
| HGM 4 | Hollow glass microspheres with a density of 0.30 g/cc and an isostatic crush strength of 6000 psi commercially available from 3M Company, Maplewood, MN under the trade designation "3M ™ Glass Bubbles XLD6000." |
| Ethylene glycol diglycidyl ether | Sigma-Aldrich Corporation, St. Louis, MO. |
| Methyl tetrahydraphthalic anhydride | Tokyo Chemical Industry Co., Ltd., Tokyo, Japan. |
| N,N-dimethylaniline | Alfa Aesar, Ward Hill, MA. |

Preparation of HGM/Powdered Epoxy Powder

Different grades of 3M HGM's and an uncured Powdered Epoxy were added to an 8 oz. (237 milliliter) glass jar. The mixture was mixed using a Resodyne vibratory mixer set at 60% intensity and 60 Hz for 1 minute. Table 1 below shows a series of sample prepared and their theoretical density, which was calculated based on the density of 1.16 g/cc for Powdered Epoxy.

TABLE 1

Compositions of powder mixtures

| HGM volume % | HGM density (g/cc) | HGM1 0.125 | HGM2 0.230 | HGM3 1.200 | HGM4 0.300 |
| --- | --- | --- | --- | --- | --- |
| 45 | HGM Wt % | 8.1% | 14.0% | 45.8% | 17.5% |
|  | Composite Density, g/cc | 0.694 | 0.742 | 1.178 | 0.773 |
|  | HGM Wt/20 g Epoxy, g | 1.76 | 3.24 | 16.93 | 4.23 |
| 50 | HGM Wt % | 9.7% | 16.5% | 50.8% | 20.5% |
|  | Composite Density, g/cc | 0.643 | 0.695 | 1.180 | 0.730 |
|  | HGM Wt/20 g Epoxy, g | 2.16 | 3.97 | 20.69 | 5.17 |
| 55 | HGM Wt % | 11.6% | 19.5% | 55.8% | 24.0% |
|  | Composite Density, g/cc | 0.591 | 0.649 | 1.182 | 0.687 |
|  | HGM Wt/20 g Epoxy, g | 2.63 | 4.85 | 25.29 | 6.32 |
| 59 | HGM Wt % | 13.4% | 22.2% | 59.8% | 27.1% |
|  | Composite Density, g/cc | 0.583 | 0.600 | 1.184 | 0.653 |
|  | HGM Wt/20 g Epoxy, g | 3.10 | 5.71 | 29.77 | 7.44 |
| 60 | HGM Wt % | 13.9% | 22.9% | 60.8% | 28.0% |
|  | Composite Density, g/cc | 0.539 | 0.602 | 1.184 | 0.644 |
|  | HGM Wt/20 g Epoxy, g | 3.23 | 5.95 | 31.03 | 7.76 |

Curing of HGM/Powdered Epoxy Powder 2-4 g of the "HGM/Powdered Epoxy Powder" made above was added to a stainless mold that had a diameter of 1 inch (2.54 cm). The mold was placed into a vacuum oven at 320° F. 15 psi (103 kPa) of top load pressure was applied to the mold and 28 psi (193 kPa) vacuum pressure was maintained for 90 minutes. The mold assembly was then removed from the oven and allowed to cool to 20° C. before retrieving the cured part.

Uniaxial Compression Testing

Uniaxial compression testing was performed in accordance with ASTM D695-10. A cylindrical shaped plug was weighed and measured for physical dimensions and placed between parallel plates at the center of these plates. The specimen was then put under a slight contact pressure and compression testing initiated at a rate of 2 mm/min until the specimen yielded while the test load was recorded. At this point, the test was stopped.

Hydrostatic Compression Testing

The hydrostatic compression test was performed using a hydraulic test chamber that is capable of producing pressures up to 30,000 psi (207 MPa) using oil as a hydraulic fluid. The test procedure is similar to that of ASTM D3102-78, except the cured syntactic form sample is placed directly into the hydraulic test chamber.

In the test, a displacement pump delivers the hydraulic fluid with precision volume into the test chamber, while the pressure is recorded continuously until a designated pressure is reached. The percent of volume collapsed under the pressure is calculated by subtracting the compressibility of the fluid itself. The weight and the dimension of the cured syntactic foam part were measured. The part was placed into the chamber of the strength tester and submerged into hydraulic fluid. The volume retention was then recorded as a function of pressure. The hydrostatic pressure resistance was defined as the pressure at which 90% volume retention was measured.

Water Immersion Pressure Test

Samples of syntactic foam were prepared at various loadings of glass microspheres up to 75 volume % and submerged in water at 20° C. at a pressure of 5500 psi for 4 weeks. Based on the measured initial and final weights and dimensions of the syntactic foam samples, water uptake was measured as a percentage of initial weight, as well as the density change.

Comparatives A and B

Two comparative examples were prepared with a liquid epoxy according to a formulation where the amount of HGM2 was adjusted to 59 volume % to achieve a cured density of around 0.6 g/cc. This formulation is provided in Table 2 below:

TABLE 2

Liquid Epoxy-based formulation

| Component | Parts by weight | Density (g/cc) | Volume (%) |
|---|---|---|---|
| Liquid Epoxy | 45 | 1.162 | 24 |
| Ethylene glycol diglycidyl ether | 6 | 1.118 | 3 |
| HGM 2 | 22 | 0.23 | 59 |
| Methyl tetrahydraphthalic anhydride | 27 | 1.21 | 14 |
| N,N-dimethylaniline | 0.1 | 0.956 | 0.03 |

Liquid resin components were added to a mixing cup and premixed using a Flacktek Speed Mixer at 3000 rpm for 1 minute. Then HGM2 was added and mixing continued for another 1 minute at the same mixing speed. The sample was then placed in a vacuum oven at 70° C. to de-gas for 15-30 minutes and mixed again as above without degassing again. The de-gassed sample was then transferred to a stainless steel cylindrical mold. The mold was placed into a vacuum oven and 15 psi (103 kPa) dead load pressure was applied on top of the mold. The sample was then cured under vacuum at 110° C. for 2 hrs, 140° C. for 4 hrs, and finally 160° C. for 4 hrs. The sample was removed from the mold after being cooled to room temperature.

Comparative Examples A and B were replicates and used to obtain uniaxial and hydrostatic compression test data, respectively.

Examples 1 and 2

Examples 1 and 2 were prepared by mixing HGM 2 with Powdered Epoxy based on the amounts provided in Table 3 below. The amount of HGM was adjusted to 59 volume % to achieve the cured density around 0.6 g/cc.

TABLE 3

Powdered Epoxy-based formulation

| Component | Parts by weight | Density (g/cc) | Volume (%) |
|---|---|---|---|
| Powdered Epoxy | 100 | 1.16 | 41 |
| HGM 2 | 28.5 | 0.23 | 59 |

The two powder components were mixed using a Resodyne acoustic mixer mixing for 1 mm at 50% intensity. The powder mixture was transferred to a cylindrical stainless steel mold, then placed into a vacuum oven. A 15 psi (103 kPa) dead load pressure was placed on top of the mold, and the sample was cured under vacuum at 160° C. for 4 hrs. The sample was removed from the mold after being cooled to room temperature.

Examples 1 and 2 were replicates and used to obtain uniaxial and hydrostatic compression test data, respectively. Consolidated test data for Examples and Comparatives under uniaxial and hydrostatic compression are provided below in Table 4.

TABLE 4

Uniaxial and hydrostatic compression test data

| | Measured Density (g/cc) | Uniaxial Compression Peak Stress (MPa) | Uniaxial Compression Modulus (GPa) | Hydrostatic Strength (MPa) |
|---|---|---|---|---|
| Comparative A | 0.525 | 39.3 ± 9.6 | 1840 ± 170 | — |
| Example 1 | 0.614 | 64.6 ± 1.8 | 2390 ± 26.1 | — |
| Comparative B | 0.469 | — | — | 37.1 |
| Example 2 | 0.616 | — | — | 87 |

Examples 3-14

Examples 3-5 were made using the same methods used to make Examples 1 and 2, except using the glass microsphere compositions provided in Table 5 below. The same table shows the hydrostatic pressure resistance as a function of the syntactic foam density from different glass bubbles.

TABLE 5

Hydrostatic pressure resistance for various syntactic foams

| Example | Glass microsphere | Volume % of glass microspheres | Hydrostatic pressure resistance (MPa) |
|---|---|---|---|
| 3 | HGM1 | 45 | 157 |
| 4 | | 50 | 150 |
| 5 | | 55 | 144 |
| 6 | | 60 | 78 |
| 7 | HGM2 | 45 | 119 |
| 8 | | 50 | 114 |
| 9 | | 55 | 94.6 |
| 10 | | 60 | 63.6 |
| 11 | HGM3 | 45 | 84.6 |
| 12 | | 50 | 79.1 |
| 13 | | 55 | 74.2 |
| 14 | | 60 | 54.9 |

Comparative C and Examples 15-18

To determine the extent to which the density can be reduced without inducing void formation, an additional series of measurements was made where moisture uptake was measured as the volume % of HGM2 glass microspheres in the foam was increased. In this data, significant moisture uptake is indicative of water permeation and reduced buoyancy. Results are reported in Table 6 below.

TABLE 6

Moisture uptake for various syntactic foams

| Example/ Comparative | HGM2 (volume %) | Initial density (g/cc) | Final density (g/cc) | Density change (% by weight) |
|---|---|---|---|---|
| C | 0 | 1.191 | 1.182 | 0.6 |
| 15 | 59 | 0.618 | 0.636 | 2.85 |
| 16 | 65 | 0.503 | 0.8441 | 67.8 |
| 17 | 70 | 0.421 | 0.9085 | 116 |
| 18 | 75 | 0.360 | 0.9555 | 165.1 |

All cited references, patents, and patent applications in the above application for letters patent are herein incorporated by reference in their entirety in a consistent manner. In the event of inconsistencies or contradictions between the incorporated references and this application, the information in the application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a foam composition comprising:
   obtaining a mixture by blending the following components:
      35 to 60 volume percent thermally fusable powder; and
      40 to 65 volume percent glass microspheres, each amount based on the overall volume of the mixture; and
   while applying a load to a mold containing the mixture to shape the mixture,
   heating the thermally fusable powder under a vacuum to provide a hardened syntactic foam, the vacuum being sufficient to remove substantially all embedded voids in the hardened syntactic foam such that the hardened syntactic foam has at most 1.5 percent by volume of such embedded voids, excluding voids associated with the glass microspheres.

2. The method of claim 1, further comprising disposing a barrier layer over at least a portion of the hardened syntactic foam.

3. The method of claim 1, wherein the hardened syntactic foam has at most 0.5 percent by volume of such embedded voids excluding voids associated with the glass microspheres.

4. The method of claim 1, wherein the thermally fusable powder comprises a thermoset selected from: one-part crosslinkable epoxy resins, phenolic resins, epoxy modified polyesters, urethane acrylics, urethane polyesters, epoxy functionalized acrylics, glycidyl methacrylate acrylics, polyester triglycidyl isocyanurates, and copolymers and mixtures thereof.

5. The method of claim 1, wherein the glass microspheres have a median diameter $D_{50}$ of from 10 micrometers to 70 micrometers.

6. The method of claim 1, wherein the glass microspheres have a $D_{80}$-$D_{20}$ diameter ratio of from 5 micrometers to 50 micrometers.

7. The method of claim 1, wherein the thermally fusable powder has a median particle diameter ranging from 10 micrometer to 100 micrometers.

8. The method of claim 1, wherein the thermally fusable powder and glass microspheres have a median particle diameter ratio ranging from 0.5:1 to 1.25:1.

9. The method of claim 1, wherein the shaped mixture defines a recess or aperture for accommodating at least a portion of a subsea conduit.

10. A foam composition made using the method of claim 1.

11. The foam composition of claim 10, further comprising a barrier layer disposed on at least a portion of the hardened syntactic foam.

12. A buoyancy module for a subsea conduit comprising a flotation unit comprising the foam composition of claim 10, and a fastening mechanism for coupling the flotation unit to the subsea conduit.

* * * * *